United States Patent [19]

Welcome, deceased et al.

[11] 4,083,823

[45] Apr. 11, 1978

[54] NO-BAKE FOUNDRY BINDER SYSTEM

[75] Inventors: James R. Welcome, deceased, late of North Tonawanda, N.Y.; by Elizabeth M. Welcome, administratrix, Belpre, Ohio

[73] Assignee: Hooker Chemicals & Plastics Corporation, Niagara Falls, N.Y.

[21] Appl. No.: 557,709

[22] Filed: Mar. 12, 1975

[51] Int. Cl.$^2$ ............................................. C08G 63/76
[52] U.S. Cl. .................... 260/40 R; 106/83; 260/29.2 E; 260/29.2 UA; 260/75 SB; 260/DIG. 40
[58] Field of Search .... 260/40 R, DIG. 40, 29.2 UA, 260/29.2 E, 75 SB; 106/83

[56] References Cited

U.S. PATENT DOCUMENTS

| | | | |
|---|---|---|---|
| 2,214,349 | 9/1940 | Ruddle et al. | 106/83 X |
| 2,483,836 | 10/1949 | McCoy | 106/83 |
| 2,646,410 | 7/1953 | Kneisley | 260/29.2 UA |
| 2,664,405 | 12/1953 | Andersen et al. | 260/29.2 E |
| 3,240,736 | 3/1966 | Beckwith | 260/39 R |
| 3,297,616 | 1/1967 | Fisher et al. | 260/45.7 R X |
| 3,371,712 | 3/1968 | Adams | 260/29.2 UA |
| 3,392,127 | 7/1968 | du Tertre | 260/40 R |
| 3,547,840 | 12/1970 | Stastny et al. | 260/45.7 R X |
| 3,978,018 | 8/1976 | Self | 260/29.2 UA |

*Primary Examiner*—Sandra M. Person
*Attorney, Agent, or Firm*—Peter F. Casella; James F. Mudd; William G. Gosz

[57] ABSTRACT

A no-bake foundry binder system comprises an alkali metal silicate binder and a hydroxy-terminated polyester.

27 Claims, No Drawings

NO-BAKE FOUNDRY BINDER SYSTEM

BACKGROUND OF THE INVENTION

The use of alkali metal silicates as a binder for foundry cores and molds has been known for a long time. More recently, carbon dioxide has been used to cure the silicate in a process known as the "Carbon Dioxide Process". When the $CO_2$ gas is passed through the wet sand-silicate mixture after it has been fabricated into a desired shape, the gas combines chemically with the silicate binder to form a silicic acid gel which cements the sand grains together and accomplishes the desired binding in a short period of time. A fuller description of the $CO_2$ process can be found in K. E. L. Nicholas, The $CO_2$-Silicate Process in Foundries (1972).

A major disadvantage encountered in using silicate bonded sand compositions is poor collapsibility after the metal has been poured in and solidified in the mold. In contrast to organic binders, the silicate does not burn out at low temperatures, but sinters with the sand at high temperatures to form glasses. Such sintering begins to occur at temperatures of about 1475° F. and increases rapidly above about 1560° F. As a consequence, collapsibility and shake-out features are generally very poor, and frequently inadequate, in sand molds and cores bonded with the alkali metal silicates, and the castings may be difficult to remove.

A better collapsibility can be obtained by reducing the quantity of silicate binder but this practice is undesirable because if the amount of silicate solution is too low, the molds and cores are exceedingly friable and are frequently unacceptable for general foundry use. Collapsibility can also be improved somewhat by incorporating a minor amount of certain filler or burn-out materials such as asphalt emulsions, cellulose fibers, cereal binders and the like, but these materials are a nuisance to work with and difficult to handle in the sand-silicate formulations. Additionally, such additives frequently increase the friability of the cores.

Another type of foundry binder compositions are classified "no-bake binders". These binders are capable of forming completely cured cores or molds at room temperature without the use of gaseous catalysts. Optionally, they can be baked to accelerate the curing.

More recently, sodium silicate binder systems have been developed which use simple organic esters for curing the silicate binder. Typical organic esters include diacetin, triacetin, glycol propionate, and mixtures thereof. 100% triacetin is reported to be slow, while 100% diacetin is reported to be very fast. Set-up times as short as 8.5 minutes to as long as 10 hours have been reported. See, Modern Casting, September 1974, pages 43 et seq.

It has now been found that the combination of an alkali metal silicate and a hydroxyl-terminated polyester provides a no-bake foundry binder system which rapidly cures and develops sufficient tensile strength. Foundry cores made by this new system reasonably withstand degradation from humidity and have the desired collapsibility of shake-out from the poured casting.

Accordingly, it is the object of this invention to provide a silicate no-bake binder foundry system which can be used to fabricate excellent quality foundry cores and molds having high strength and excellent collapsibility or shake-out characteristics. These and other objects of the invention will become apparent to those skilled in the art from the following detailed description.

SUMMARY OF THE INVENTION

This invention relates to a no-bake foundry binder system and more particularly to a no-bake foundry binder system which comprises an alkali metal silicate binder and a hydroxyl-terminated polyester.

DESCRIPTION OF THE PREFERRED EMBODIMENTS

The objects of this invention are obtained by using a binder system which includes an alkali metal silicate and a hydroxyl-terminated polyester in preparing the foundry molds and cores.

Any of the alkali metal silicates which have been heretofore used in the carbon dioxide process can be used in the process of this invention. Thus, any of the known liquid alkali metal silicates, which are compositions in which the alkali metal silicate, normally liquid at room temperature, is dissolved in water, can be used. The silicates are typically represented by the formula $M_2O \cdot nSiO_2$ where M represents the alkali metal and $n$ is about 0.5–4. Although any of the alkali metals can be used, sodium is preferred. It is also preferred that $n$ be at least 1.5 and more preferably at least 2.0. The silicates typically have a solids content of about 30–50%, preferably about 34–46% solids.

Any hydroxyl-terminated polyester can be used in this invention. Such polyesters are the condensation product of a polyhydric alcohol with a carboxylic acid or acid anhydride or acid halide. In general, the polyhydric alcohols can have from 2–6 hydroxyl groups and 2–20 carbon atoms. Typical examples include dihydric alcohols such as ethylene glycol, diethylene glycol, propylene glycol, dipropylene glycol, polypropylene glycol, hexylene glycol, 2-methyl-2-ethyl-1,3-propanediol, thiodiglycol, neopentyl glycol, 1,2-dimethyl-1,2-cyclopentanediol, and polyols such as glycerol, trimethylol propane, butanetriol, pentaerythritol, mannitol, sorbitol, oxyalkylated novolacs, and the like. The carboxylic component of the polyester can be a polycarboxylic acid, acid anhydride or acid halide having 2–4 carboxyl groups and 2–60 carbon atoms. Typical examples include the respective acids, anhydrides and halides of adipic, succinic, fumaric, glutaric, oxalic, melonic, maleic, phthalic, isophthalic, terephthalic, tetrachlorophthalic, chlorendic, trimellitic, trimesic, hemimellitic, itaconic, benzophenone tetracarboxylic acid, and the like. Also useful are the polymerized acids referred to as dimer acids and trimer acids, and mixed acids which include mixtures of monobasic, dibasic and polybasic acids. The carboxylic and hydroxy components of the polyester can be aliphatic, cycloaliphatic, aromatic or heterocyclic, and can be either saturated or unsaturated. As is conventional in the polyester art, mixtures of the polyhydric alcohols and/or carboxylic compounds can be used to vary the properties of the resulting polyester.

Also within the scope of the present invention is the use of oil modified hydroxyl-terminated polyesters. Such oil modified materials are those in which a fatty acid or oil such as linseed oil, cottonseed oil, castor oil, vegetable oils, animal oils, the corresponding fatty acids, and various mixtures thereof, are reacted into the polyester.

Production of the polyester is conventional and need not be described in any detail here. Typically, the selected ingredients in predetermined portions are introduced into a suitable esterification vessel, blanketed with an inert atmosphere such as nitrogen or carbon dioxide, agitated and heated to a reaction temperature generally about 145°–200° C., and after the desired degree of reaction has been attained, as conveniently determined by employing the acid number technique or measuring the amount of water liberated, the reaction mixture is cooled.

As noted above, any hydroxyl-terminated polyester can be employed in the process of this invention. The hydroxyl moieties aid in binding the organic polyester to the inorganic silicate. The hydroxyl-terminated polyester can have an acid number of about 1–50 mg KOH/g, preferably about 5–20 mg KOH/g, and a hydroxyl number of at least about 50, preferably about 50–1000 mg KOH/g, more preferably about 150–700 mg KOH/g. The polyesters preferably have a CP viscosity at 25° C. of less than about 2000 and most preferably less than about 1000. The polyesters employed are preferably liquid at room temperature. However, it is also within the scope of this invention to dissolve the polyester in a solvent such as acetone, Cellosolve acetate, lower alkanols such as methanol, ethanol, and the like, and lower molecular weight glycols, such as ethylene glycol.

If desired, any of the known organic esters, e.g., diacetin or triacetin, can be used in conjunction with the polyesters of this invention. The amount of auxiliary organic ester can be varied substantially depending on the desired set-up time, for example, from about .50–150% by weight based on the amount of the polyester can be employed.

In the preparation of the moldable compositions of the present invention, a foundry aggregate is placed in a conventional muller or other suitable mixer. The aggregate of discrete solid particles is normally sand and frequently contains minor amounts of other materials such as iron oxide, cereal and the like. Other refractory materials such as silica flour and various other inorganic refractory materials can also be used. The liquid alkali metal silicate is introduced to the aggregate in a proportion sufficient to provide about 0.5–5 weight percent of silicate based on the weight of the foundry aggregate, preferably in the range of from about 2–4 weight percent, and is mixed for 1–10 minutes, preferably about 1–3 minutes. The aggregate grains are thereby coated with the liquid alkali metal silicate. Thereafter, the hydroxyl-terminated polyester is introduced into the mixture of aggregate and liquid alkali metal silicate and mixing is continued for about 1–5 minutes, preferably about 2–3 minutes. The polyester is employed in a proportion sufficient to provide about 0.05–5 weight percent, preferably about 0.1–2.5 weight percent of the polyester based on the weight of the foundry aggregate. The silicate and polyester are employed in a weight ratio which can vary from about 50:1–3:1, preferably about 20:1–4:1, liquid alkali metal silicate to hydroxyl-terminated polyester. The resulting moldable composition is then discharged from the mixing and introduced into a suitable mold of the desired shape. In the preparation of the moldable compositions, the polyester can be added to the sand first, followed by the silicate, or the polyester and silicate can be pre-mixed and added together to the sand.

The moldable composition can also be prepared by employing an apparatus known as a "slinger" which comprises two screw conveyors which converge at a common point into a single screw conveyor. A portion of the foundry aggregate and the liquid alkali metal silicate are introduced into one of the two feed screw conveyors and the polyester and remainder of the foundry aggregate are introduced into the second feed screw conveyor. The two screw conveyors discharge the sand coated with the respective components into the common screw conveyor where all of the reacting components are intimately mixed with the total charge of foundry aggregate.

The moldable composition is allowed to remain in the mold until a sufficient green strength has been developed at which time it is removed from the mold by conventional means.

In order to further illustrate the invention, various Examples are set forth below. In these Examples, as well as throughout the specification and claims, all parts and percentages are by weight and all temperatures are in degrees Centigrade unless otherwise specified.

EXAMPLE 1

A charge containing 222 g (1.5 mols) of phthalic anhydride, 224 g (3.6 mols) of ethylene glycol, 15 g (0.108 mol) of pentaerythritol and 0.5 g of zinc oxide were placed in a 500 ml 3-necked flask which was fitted with an agitator, thermometer and a Dean Stark moisture trap. The mixture was then agitated and heated to 175°–180° C. for 3 hours and the resulting clear resin cooled to room temperature. The thus obtained polyester had an acid number of 38.18 and a hydroxyl number of 464.16 mg KOH/g.

A sand mix was made by blending 20 g of the hydroxyl-terminated polyester resin with 2000 g of a lake sand followed by blending 80 g of sodium silicate ($n = 2.4$) into the mixture and the resulting mix was molded. The molded specimens were allowed to cure at room temperature. The average tensile strength at the end of 17 hours was 237 psi.

EXAMPLE 2

Into the esterification apparatus of Example 1 was charged 75 g (0.75 mol) succinic anhydride, 105 g of a mixture of mono- and polybasic acids which were $C_8$–$C_{12}$ and higher molecular weight fatty acids, 124 g (2 mols) ethylene glycol and 30.6 g (0.333 mol) glycerol. The mixture was heated to 165°–170° C. and held at that temperature for 40 minutes, then heated to 170°–175° C. for an additional 40 minutes, heated to 180°–185° C. for 90 minutes, and finally heated to 185°–190° C. for 3 hours. After cooling to room temperature, the resulting hydroxyl-terminated polyester resin was found to have an acid number of 18.6 and a hydroxyl number of 527.7 mg KOH/g.

A sand mix was made by blending 12 g of the polyester resin, 60 g of a liquid sodium silicate ($n=2.4$) and 2000 g of a lake sand and the mix was introduced into a mold. A room temperature setting time of 24 minutes was observed and the tensile strength of the molded specimens after 24 and 48 hours were 190–195 psi and 182–188 psi, respectively.

EXAMPLE 3

Following the procedure of Example 1, a hydroxyl containing polyester was prepared with 83 parts maleic anhydride, 63 parts mixed acids, (a commercial mixture of $C_{10}$ to $C_{16}$ monobasic acids, $C_5$ to $C_{12}$ dibasic acids and higher molecular weight polybasic acids, manufactured under the tradename Emery 9874-A Acid by Emery Industries, Inc.), 124 parts ethylene glycol and 36.6 parts of glycerol. The resulting polyester resin had an acid number of 16.4 and a hydroxyl number of 540.5 mg KOH/g.

A sand mix was made by blending 7.5 g of the resin and 75 grams of sodium silicate with 2500 g of sand. Molded test specimens exhibited a mold strength of 2 psi at 3 minutes, 4.5 psi at 6 minutes, 6 psi at 9 minutes and 10 psi at 15 minutes. The average tensile strength at 24 hours was 230 psi, at 48 hours was 180 psi and at 72 hours was 200 psi.

EXAMPLE 4

Following the procedure of Example 1, a polyester resin was prepared from 37 parts phthalic anhydride, 125 parts succinic anhydride, 217 parts ethylene glycol and 21.5 parts pentaerythritol. The hydroxylated polyester resin had an acid number of 11.55 and a hydroxyl number of 552.80 mg KOH/g.

10 g of the resin, 80 g of liquid sodium silicate and 2000 g of sand were mixed and molded specimens were prepared. The mixture exhibited a set time of 15 minutes and had an average tensile strength after 3 hours of 82 psi. The specimens exhibited a mold strength of 3.5 psi after 5 minutes, 22 psi after 14 minutes, 26 psi after 15 minutes, 29 psi after 18 minutes and greater than 30 psi after 19 minutes. The scratch hardness after 2 hours was 95–100.

EXAMPLE 5

A hydroxyl containing polyester resin having an acid number of 18.40 and a hydroxyl number of 213.8 mg KOH/g was prepared from 294 parts of the mixed acids described in Example 3, 91.1 parts of ethylene glycol and 5.5 parts of glycerol. 7.5 g of the resin were mixed with 1500 g of sand and 60 g of sodium silicate and test specimens were prepared. The mold strength observed was 0 psi at 4 minutes, 1 psi at 8 minutes, 2 psi at 12 minutes, 5 psi at 16 minutes and 11 psi at 30 minutes. The average tensile strength at 24 hours was 262 psi and after 5 days was 244 psi.

EXAMPLE 6

A hydroxylated polyester resin was prepared from 85 parts of succinic anhydride, 63 parts of the mixed acids described in Example 3, 124 parts ethylene glycol and 30.6 parts glycerol. The resin had an acid number of 13.82 and a hydroxyl number of 587.78 mg KOH/g.

15 g of the resin were mixed with 75 g of sodium silicate and 2500 g of sand and test specimens were prepared. The average tensile strength at 24 hours was 178 psi and at 48 hours was 179 psi. The observed mold strength was 1.5 psi at 3 minutes, 7.5 psi at 6 minutes, 13.5 psi at 9 minutes and 23 psi at 15 minutes.

EXAMPLE 7

A polyester resin was prepared from 85 parts succinic anhydride, 63 parts of the mixed acids described in Example 3, 124 parts ethylene glycol and 30.6 parts of glycerol. The resulting resin was a black liquid having a specific gravity at 25° C. of 1.193, a CP viscosity at 25° C. of 500, an acid number of 13.82 and a hydroxyl number of 587.78 mg KOH/g.

Molded test specimens were prepared by mixing lake shore sand with 3% (based on sand) of sodium silicate and 16% polyester resin based on the silicate. The humidity was 60% and a set time of 12 minutes was observed. The average tensile strength was 177 psi at 24 hours and 173 psi at 48 hours. At 2 hours the scratch hardness was 90–95.

EXAMPLE 8

A polyester resin was prepared from 650 parts succinic anhydride, 210 parts of the mixed acids described in Example 3, 700 parts ethylene glycol, 190 parts glycerol and 190 parts sorbitol. 167 parts of methanol was used as a solvent for the resin. The resin had an acid number of 14.4 mg KOH/g, a hydroxyl number of 680 mg KOH/g, a specific gravity at 25° C. of 1.201, a CP viscosity at 25° C. of 258.

Molded test specimens were prepared by mixing lake shore sand, 3% sodium silicate (based on the sand) and 16% polyester resin based on the silicate. The humidity was 60% and the set time was 7.5 minutes. The average tensile strength was 163 psi both at 24 hours and 48 hours. The scratch hardness at 2 hours was 90–95.

EXAMPLE 9

A polyester resin was prepared from 59.5 parts succinic anhydride, 44.1 parts of the mixed acids described in Example 3, 70 parts ethylene glycol, 19 parts glycerol and 19 parts sorbitol. 18 parts of methanol were used as a solvent for the resin.

Molded test specimens were prepared using lake shore sand, 3% sodium silicate (based on the sand) and 17.5% polyester resin based on the weight of the silicate. The humidity was 57% and a set time of 12.5 minutes was observed. The average tensile strength was 155 psi at 24 hours and 123 psi at 48 hours. The scratch hardness was 85–90 at 2 hours and 90–95 at 24 hours.

The polyester resin used in this Example was a dark brown liquid having an acid number of 13.02, a hydroxyl number of 596 mg KOH/g, a specific gravity at 25° C. of 1.173, and a CP viscosity at 25° C. of 284.

EXAMPLE 10

A polyester resin which can be used in this invention was prepared according to the procedure of Example 1 using 38 parts propylene glycol, 50 parts dimer acid (Empol 1003, made by Emery Industries), 148 parts phthalic anhydride, 106 parts ethylene glycol and 25 parts pentaerythritol. The resulting polyester had an acid number of 30.17, mg KOH/g a hydroxyl number of 443.15 mg KOH/g, a refractive index of 1.5152 and a moisture content of 0.53%.

EXAMPLE 11

A polyester resin which can be used in this invention was prepared according to the procedure of Example 1 using 222 parts phthalic anhydride, 23 parts benzophenone dicarboxylic acid anhydride, 224 parts ethylene glycol and 15 parts pentaerythritol. The resulting polyester had an acid number of 36.55, mg KOH/g a hydroxyl number of 505.09 mg KOH/g, and a moisture content of 0.66%.

EXAMPLE 12

A polyester resin which can be used in this invention was prepared according to the procedure of Example 1 using 88 parts phthalic anhydride, 125 parts of 55% hydroxymethyl diacetone acrylamide, 12.25 parts pentaerythritol, 55.8 parts ethylene glycol and 0.2 part zinc oxide. The resulting polyester had an acid number of 14.01 mg KOH/g, and a hydroxyl number of 161.76 mg KOH/g. The polyester resin was dissolved in 80 parts Cellosolve acetate.

EXAMPLE 13

A polyester resin which can be used in this invention was prepared according to the procedure of Example 1 using 29.6 parts phthalic anhydride, 40 parts succinic anhydride, 125 parts of 55% hydroxymethyl diacetone acrylamide, 12.25 parts pentaerythritol, 71.5 parts 2,2,4-trimethyl-1,3-pentanediol, and 24.8 parts ethylene glycol. The hydroxylated polyester had an acid number of 13.76 mg KOH/g, a hydroxyl number of 164.20 mg KOH/g, and a moisture content of 0.20%. The resin was diluted with 53 parts Cellosolve acetate to make an 80% solution.

EXAMPLE 14

A polyester resin which can be used in this invention was prepared according to the procedure of Example 1 using 138 parts of glycerol, 225 parts of phthalic anhydride and 49.72 parts of ethylene glycol. The resulting polyester had an acid number of 19.27 mg KOH/g and a hydroxyl number of 409.2 mg KOH/g. To 381.5 parts of this polyester resin was added 100 parts of ethylene glycol.

EXAMPLE 15

A polyester resin which can be used in this invention was prepared according to the procedure of Example 1 using 238 parts of dimer acid (Empol 1003), 45.6 parts of ethylene glycol and 2.7 parts of glycerol. The resulting polyester had an acid number of 6.27 mg KOH/g and a hydroxyl number of 160.2 mg KOH/g.

EXAMPLE 16

Comparative Example

Molded test specimens were prepared by mixing 2000 g of sand, 80 g of liquid sodium silicate and 6 g of diacetin. A set time of 23 minutes, an overnight tensile strength of 262 psi and a scratch hardness of 95-100 were observed. The mold strength of the specimens was 4 psi at 10 minutes, 11 psi at 15 minutes, 28 psi at 20 minutes and 30 psi at 23 minutes.

EXAMPLES 17-22

Six comparative tests were made in which test specimens were molded and the set time, tensile strength and mold strength determined. In each test, 2000 parts of sand were mixed with 80 parts of sodium silicate and with either a mixture of organic esters or a mixture of the polyester of this invention with an organic ester. The combination of esters or polyester and ester were:

Example 17 — 4 parts diacetin, 4 parts triacetin;

Example 18 — 5 parts diacetin, 4 parts polyester of Example 1;

Example 19 — 5 parts diacetin, 4 parts polyester of Example 14;

Example 20 — 5 parts diacetin, 6 parts polyester of Example 4;

Example 21 — 5 parts diacetin, 4 parts polyester of Example 11;

Example 22 — 6 parts diacetin, 2 parts triacetin.

The set times, tensile strengths and mold strength observed are set forth in the following Table:

TABLE

| Example Number | 17 | 18 | 19 | 20 | 21 | 22 |
|---|---|---|---|---|---|---|
| Set Time, Minutes | 120 | 30 | 25 | 15 | 25–30 | 35 |
| Average Tensile Strength, psi at 24 Hours | 100 | 215 | 273 | 194 | 222 | 130 |
| 48 Hours | 75 | 81 | 101 | 81 | 88 | 81 |
| 72 Hours | 68 | 77 | 95 | 84 | 80 | 80 |
| Mold Strength, psi at 5 Minutes | — | 0 | 0 | 0.5 | 0 | 0 |
| 10 Minutes | 1 | 3 | 2 | 9 | 2.5 | 1 |
| 15 Minutes | 3 | 10 | 9 | 19 | 6 | 4 |
| 20 Minutes | — | — | — | 30 | — | 6 |
| 25 Minutes | 6 | 19 | 25 | — | 16 | — |
| 30 Minutes | — | — | — | — | — | 14 |

In the foregoing examples, the physical tests were conducted in accordance with the American Foundrymen's Society Molding & Core Test Handbook (1963). Mold strength was determined with a Mold Strength Tester No. 454-B, scratch hardness was determined with a Scratch Hardness Tester No. 673-F, both manufactured by the Harry W. Dietert Co., Detroit, Michigan.

Various changes and modifications can be made in the process and products of this invention without departing from the spirit and the scope thereof. The various embodiments set forth herein were for the purpose of further illustrating the invention but were not intended to limit it.

I claim:

1. A no-bake process for bonding discrete solid particles consisting essentially of admixing said particles with a liquid alkali metal silicate and a hydroxy-terminated polyester resin of a polycarboxylic compound and a polyhydric alcohol and having a hydroxyl number of at least about 50, continuing the mixing of the resulting mixture to coat said particles, and curing the resulting moldable composition by reacting the alkali metal silicate with the hydroxy-terminated polyester to produce a shaped article.

2. The process of claim 1 wherein the discrete solid particles are foundry aggregate, and wherein the polyester resin has an acid number of about 1–50 and a hydroxyl number of about 50–1000.

3. The process of claim 2 wherein the polyester acid number is about 5–20 and hydroxyl number is about 150–700.

4. The process of claim 3 wherein the amount of silicate is about 0.5–5 weight percent based on the weight of the aggregate and the amount of polyester is 0.05–5 weight percent based on the weight of the aggregate.

5. The process of claim 4 wherein the amount of silicate is about 2–4% and the amount of polyester is 0.1–2.5%.

6. The process of claim 1 wherein the amount of silicate is about 0.5–5 weight percent based on the weight of the particles and the amount of polyester is 0.05–5 weight percent based on the weight of the particles.

7. A foundry aggregate composition consisting essentially of a foundry aggregate, liquid alkali metal silicate and a hydroxy-terminated polyester resin of a polycarboxylic compound and a polyhydric alcohol and having a hydroxyl number of at least about 50.

8. The composition of claim 7 wherein the amount of silicate is about 0.5–5 weight percent based on the weight of the aggregate and the amount of polyester is 0.05–5 weight percent based on the weight of the aggregate.

9. The composition of claim 8 wherein the amount of silicate is about 2–4% and the amount of polyester is 0.1–2.5%.

10. The composition of claim 8 wherein the polyester resin has an acid number of about 1–50 and a hydroxyl number of about 50–1000.

11. The composition of claim 10 wherein the polyester acid number is about 5–20 and hydroxyl number is about 150–700.

12. The composition of claim 11 wherein the polyhydric alcohol comprises ethylene glycol.

13. The compositon of claim 12 wherein the polyhydric alcohol comprises ethylene glycol and glycerol.

14. The composition of claim 12 wherein the polyhydric alcohol comprises ethylene glycol and pentaerythritol.

15. The composition of claim 12 wherein the polycarboxylic compound comprises succinic anhydride, phthalic anhydride or mixtures thereof.

16. The composition of claim 11 wherein the polyester comprises the reaction product of succinic anhydride, mixed polymerized acids, ethylene glycol and glycerol.

17. The composition of claim 11 wherein the polyester comprises the reaction product of succinic anhydride, mixed polymerized acids, ethylene glycol, glycerol and sorbitol.

18. A no-bake foundry binder system consisting essentially of a liquid alkali metal silicate and a hydroxy-terminated polyester resin of a polycarboxylic compound and a polyhydric alcohol and having a hydroxyl number of at least about 50.

19. The binder system of claim 18 wherein the weight ratio of silicate to polyester is about 50:1 to 3:1 and wherein the polyester has an acid number of about 1–50 and a hydroxyl number of about 50–1000.

20. The binder system of claim 19 wherein the weight ratio is about 20:1 to 4:1 and wherein the polyester acid number is about 5–20 and the hydroxyl number is about 150–700.

21. The binder system of claim 20 wherein the alkali metal silicate is sodium silicate.

22. The binder system of claim 20 wherein the polyhydric alcohol comprises ethylene glycol.

23. The binder system of claim 21 wherein the polyhydric alcohol comprises ethylene glycol and glycerol.

24. The binder system of claim 21 wherein the polyhydric alcohol comprises ethylene glycol and pentaerythritol.

25. The binder system of claim 22 wherein the polycarboxylic compound comprises succinic anhydride, phthalic anhydride or mixtures thereof.

26. The binder system of claim 21 wherein the polyester comprises the reaction product of succinic anhydride, mixed polymerized acids, ethylene glycol and glycerol.

27. The binder system of claim 21 wherein the polyester comprises the reaction product of succinic anhydride, mixed polymerized acids, ethylene glycol, glycerol and sorbitol.

* * * * *